_US007403104B2_

United States Patent
Robson et al.

(10) Patent No.: US 7,403,104 B2
(45) Date of Patent: Jul. 22, 2008

(54) TIRE PRESSURE MONITORING SYSTEM AND METHOD

(75) Inventors: Randall J. Robson, Lapeer, MI (US);
Jon P. Gleeson, Lapeer, MI (US);
Thomas R. Mueller, Swartz Creek, MI (US)

(73) Assignee: Delphi Technologies, Inc., Troy, MI (US)

( * ) Notice: Subject to any disclaimer, the term of this patent is extended or adjusted under 35 U.S.C. 154(b) by 490 days.

(21) Appl. No.: 11/005,270

(22) Filed: Dec. 6, 2004

(65) Prior Publication Data

US 2006/0132296 A1   Jun. 22, 2006

(51) Int. Cl.
*B60C 23/00* (2006.01)
(52) U.S. Cl. ..................... 340/445; 340/447
(58) Field of Classification Search ......... 340/445–448, 340/442; 73/146.2, 146.4, 146.5
See application file for complete search history.

(56) References Cited

U.S. PATENT DOCUMENTS

| | | | |
|---|---|---|---|
| 5,600,301 A | 2/1997 | Robinson, III | 340/442 |
| 5,838,229 A | 11/1998 | Robinson, III | 340/442 |
| 5,900,808 A * | 5/1999 | Lebo | 340/447 |
| 6,043,738 A | 3/2000 | Stewart et al. | 340/447 |
| 6,362,731 B1 * | 3/2002 | Lill | 340/445 |
| 6,417,766 B1 | 7/2002 | Starkey | 340/447 |
| 6,453,737 B2 | 9/2002 | Young et al. | 73/146.5 |
| 6,463,798 B2 | 10/2002 | Niekerk et al. | 73/146.2 |
| 6,489,888 B1 | 12/2002 | Honeck et al. | 340/442 |
| 6,571,617 B2 | 6/2003 | Van Neikerk et al. | 73/146 |
| 6,657,540 B2 | 12/2003 | Knapp | 340/442 |
| 6,668,636 B2 | 12/2003 | Nantz et al. | 73/146.4 |
| 6,691,567 B2 | 2/2004 | Walker et al. | 73/146 |
| 6,693,522 B2 | 2/2004 | Tang et al. | 340/445 |
| 2002/0092347 A1 | 7/2002 | Niekert et al. | |

FOREIGN PATENT DOCUMENTS

WO   94/20317   6/1994

* cited by examiner

*Primary Examiner*—Thomas Mullen
(74) *Attorney, Agent, or Firm*—Jimmy L. Funke

(57) ABSTRACT

A method for monitoring tire pressure of a system is disclosed. The method includes the steps of detecting a signal other than that of an in-use tire pressure signals and in response to the detection of the signal, maintaining the proper reception of the in-use tire pressure signals by a receiver.

23 Claims, 6 Drawing Sheets

TIRE PRESSURE MONITORING SYSTEM AND METHOD

TECHNICAL FIELD

The present invention generally relates to tire pressure monitoring systems. In particular, the present invention relates to a tire pressure monitoring system that detects and reacts to a signal other than that of a signal originating from an in-use tire of the tire pressure monitoring system.

BACKGROUND OF THE INVENTION

In response to regulations implemented by the United States government, automotive manufacturers are starting to provide new vehicles with tire pressure monitoring equipment. Initiated in the year 2000, Congress passed the Transportation Recall Enhancement, Accountability, and Documentation (TREAD) Act, which related to issues concerned with the operation of a vehicle with substantially under-inflated tires. Under-inflated tires can result in a tire separation/blowout, which adds to the potential for a loss of control of a vehicle. Additionally, under-inflated tires shorten tire life and increase fuel consumption.

Section 12 of the TREAD Act directed the Department of Transportation (DOT) to complete a rule requiring that new motor vehicles must include a warning system that indicates if tires are under-inflated. Ever further, in response to Section 12 of the TREAD Act, the National Highway Traffic Safety Administration's (NHTSA) National Center for Statistics and Analysis (NCSA) conducted the Tire Pressure Special Study (TPSS), which was designed to assess to what extent passenger vehicle operators are aware of the recommend tire pressures for their vehicles, the frequency and the means they use to measure their tire pressure, and how significantly actual measured tire pressure differs from the manufacturers recommend tire pressure.

As a result of the TPSS, the NHTSA favored a direct system using monitors in each wheel to determine whether tires are properly inflated so as to alert drivers when tire pressure is low. In early 2002, the NHTSA issued a regulation mandating the implementation of tire pressure monitoring systems in new vehicles beginning with the 2004 model year. Under that rule, tire pressure monitors had to warn motorists when tire pressure fell 25% or 30% below the vehicle manufacturer's recommended level. The new standard applies to passenger cars, trucks, multipurpose passenger vehicles, and buses with a gross vehicle weight rating of 10,000 pounds or less, except those vehicles with dual wheels on an axle.

Referring now to FIG. 1, a conventional tire pressure monitoring system is shown generally at 1 within a vehicle, V, shown in phantom. As seen in the Figure, a receiver 2 detects wireless tire pressure signals $3a$-$3d$ that originate from each of the four in-use tires $4a$-$4d$ located at each corner of the vehicle, V. As known in the art, each wireless tire pressure signal $3a$-$3d$ is individually recognized by the receiver 2 to properly indicate if a particular in-use tire $4a$-$4d$ is not properly inflated. Although the receiver 2 may individually recognize the inflation level of each in-use tire $4a$-$4d$, the tire pressure monitoring system 1 may be affected by a signal other than that of a signal originating from an in-use tire $4a$-$4d$, which is shown generally at 5 in FIG. 2. As such, the signal 5, which is hereinafter referred to as an interfering signal 5, may result in an incorrect reading by the receiver 2.

The interfering signal 5 may be transmitted unintentionally, for example, by an in-use tire 6 operating in conjunction with a tire pressure monitoring system of a nearby vehicle, V2. In another situation, an operator of the vehicle, V2, may intentionally transmit the interfering signal 5 to the vehicle, V, in an attempt to cause the operator of the vehicle, V, to think that the in-use tires $4a$-$4d$ are losing pressure. Subsequently, the driver of the vehicle, V, may pull over on the shoulder, S, of the road to manually inspect the in-use tires $4a$-$4d$ for pressure loss. Additionally, if one of the in-use tires $4a$-$4d$ is swapped with a spare tire $4e$, which is shown located in the trunk area of the vehicle, V, the swapped-out in-use tire $4a$-$4d$ may unintentionally transmit a false signal from the trunk area of the vehicle, V, to the receiver 2 even though the tire $4a$-$4d$ is no longer loaded by the vehicle.

Accordingly, it is therefore desirable to provide an improved tire pressure monitoring system that detects and reacts to a signal other than that of a signal originating from an in-use tire of the tire pressure monitoring system.

BRIEF DESCRIPTION OF THE DRAWINGS

The present invention will now be described, by way of example, with reference to the accompanying drawings, in which.

DESCRIPTION OF THE PREFERRED EMBODIMENT

Figure 3A:
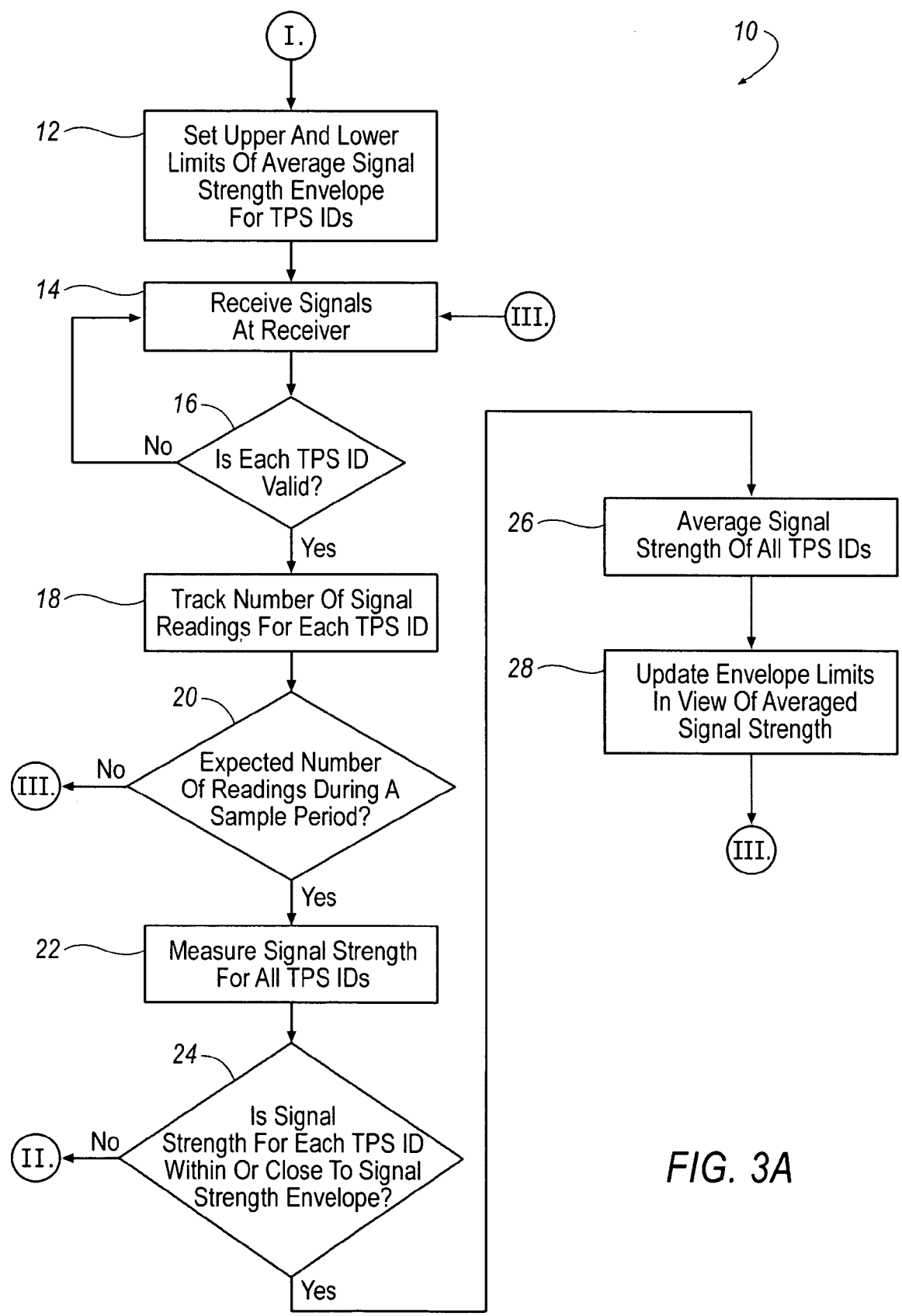
FIGS. 3A and 3B are flow chart diagrams illustrating algorithm logic of the tire pressure monitoring system according to FIG. 2.
Figure 3B:
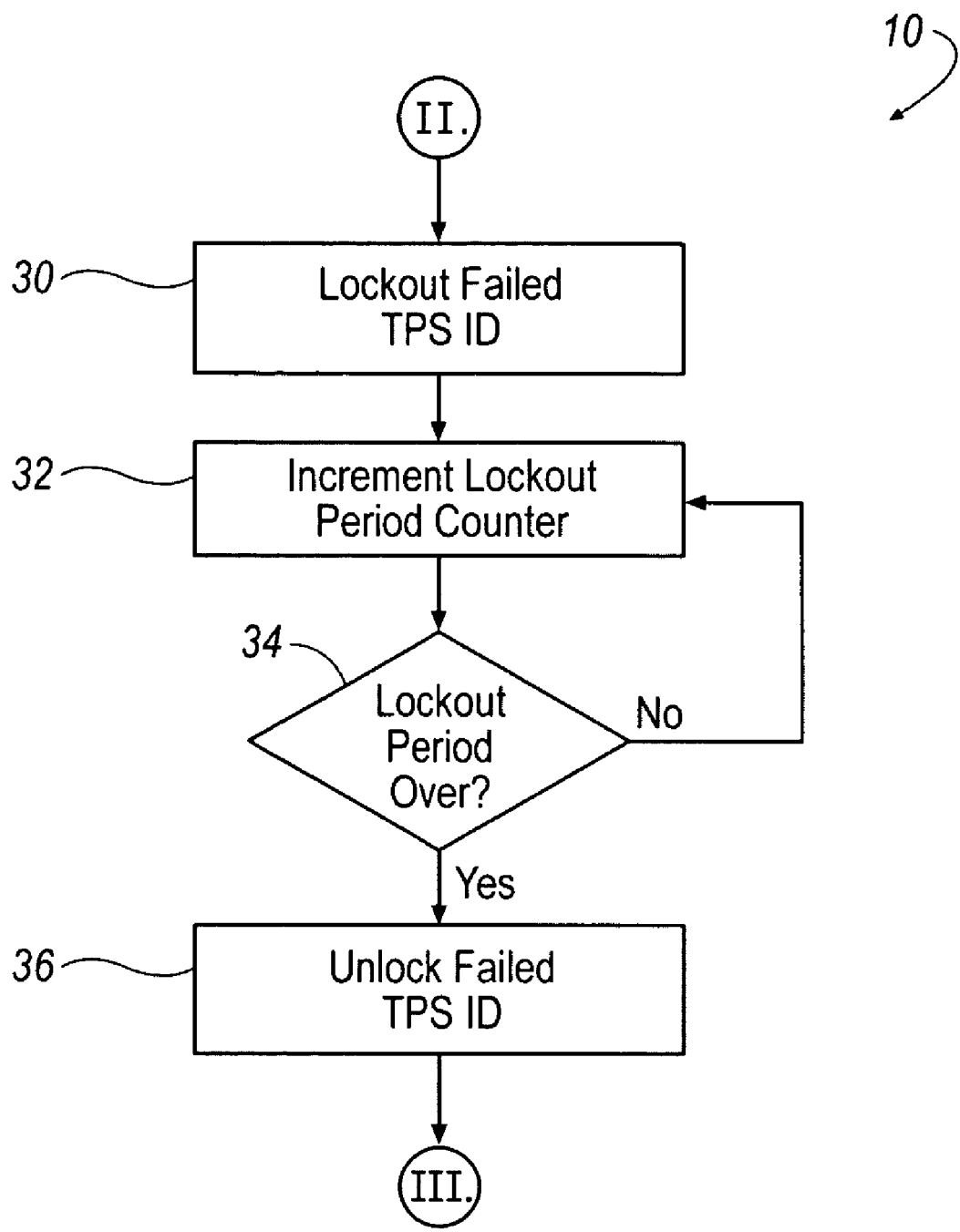
Figure 5:
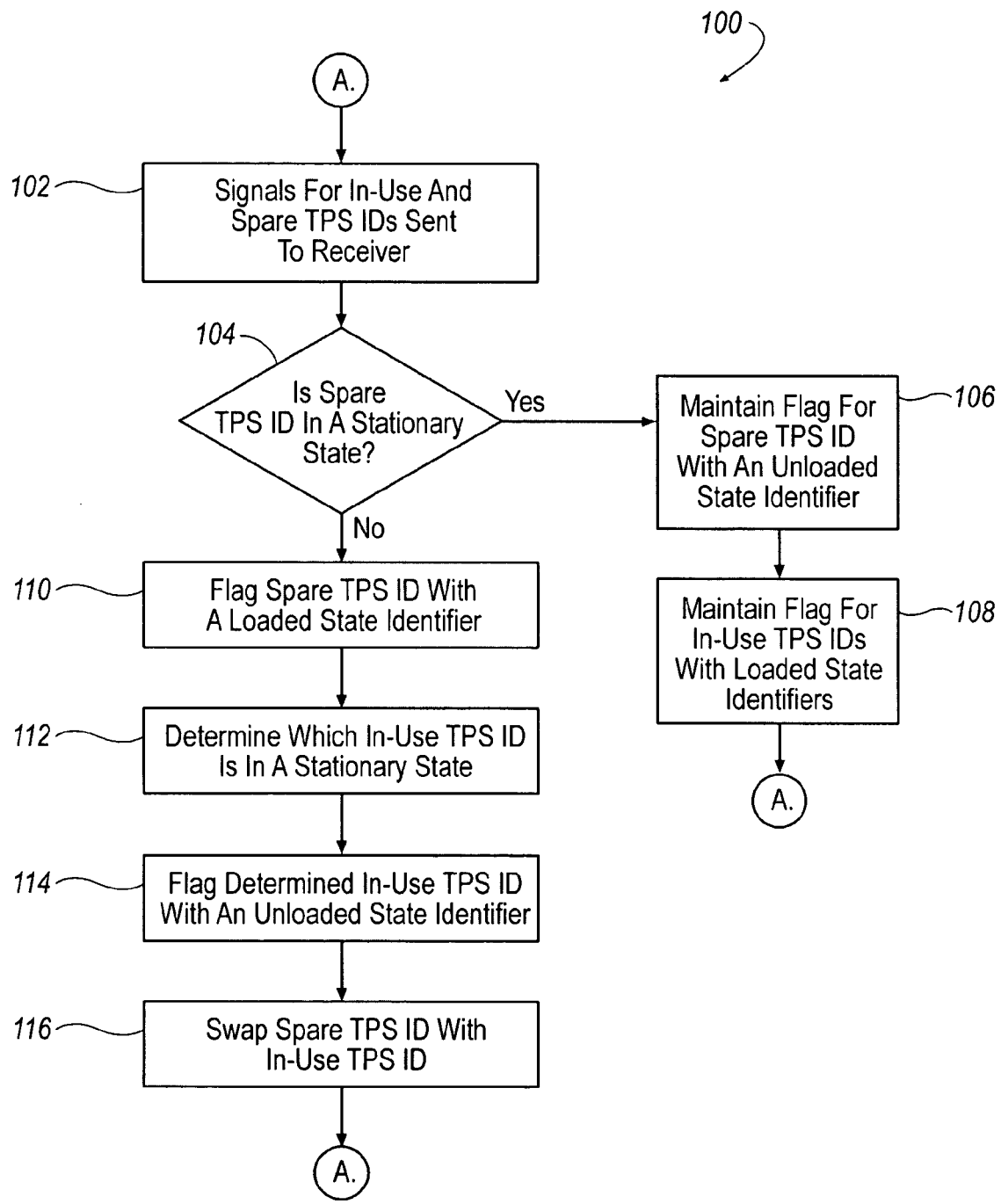
FIG. 5 is a flow chart diagram illustrating algorithm logic of the tire pressure monitoring system according to FIG. 4.

As seen in FIGS. 3A, 3B and 5, the conventional tire pressure monitoring system 1 may be modified by algorithm logic 10, 100 that detects and reacts to an interfering signal 5, 7 other than that of wireless tire pressure signals (TPS) associated with an in-use tire $4a$-$4d$. As such, any sensor data/wireless signal that appears to be foreign in nature to the algorithm 10, 100, such as, for example, the signals 5, 7, may be screened and rejected to ensure proper operation of the inventive systems $1a$, $1b$. The algorithm logic 10, 100 may, for example, be coded in the receiver's microprocessor.

Referring initially to FIG. 3A, a first algorithm 10 for screening and rejecting an interfering signal 5 is illustrated according to an embodiment. The algorithm 10 is started at step I. upon keying the vehicle, V. Although the following description is related to an active operation of the vehicle, V, (i.e., when the vehicle, V, is keyed), it will be appreciated that the algorithm 10 analyzes received tire pressure signals upon powering the receiver $2a$ with battery voltage. Accordingly, although the following description relates to a keying of the vehicle, V, tire pressure signals may be received and analyzed when the vehicle is in a keyed-off state.

When an interfering signal 5 is not detected by the algorithm 10, normal operation of the system $1a$ is carried out in a continuous looping of steps 14-28. However, if an interfering signal 5 is imparted to the receiver $2a$ in an intentional or unintentional manner, normal operation of the system $1a$ is ceased at step 24, which causes the algorithm 10 to lockout the corrupting, interfering signal 5 for a determined period of time at steps 30-36 (FIG. 3B).

During normal operation of the algorithm 10, the wireless tire pressure signals 3a-3d are individually processed by the microprocessor, but, for purposes of explanation in describing the flowchart shown in FIG. 3A, the four wireless tire pressure signals 3a-3d are examined at the same time. If simultaneous examination of the wireless tire pressure signals 3a-3d is desired, the electronics and/or software of the system 1a may be modified accordingly.

Referring now to step 12, upper and lower limits of an average signal strength envelope, which are used for comparison in the conditional test at step 24, are set after keying the vehicle, V, at step I. The upper and lower limits that are set in step 12 may be learned, dynamic values (i.e., from the function described in steps 26 and 28). Essentially, the upper and lower limits are saved in memory from a previous operation of the vehicle, V. As such, the upper and lower limits may be recalled at step 12 when the vehicle, V, is keyed in a subsequent operation. Because the upper and lower limits may vary throughout the life of the vehicle, V, the algorithm 10 will operate more efficiently with recalled, learned values at step 12 rather than re-setting the algorithm 10 to operate with a broader signal strength range defined by preset upper and lower limits at the outset of keying the vehicle, V. However, if desired, pre-programmed upper and lower limit calibration may be used at the outset of the algorithm 10 in step 12 rather than applying the use of learned values from steps 26 and 28.

Then, at step 14, the wireless tire pressure signals 3a-3d are received by the receiver 2a. Each wireless tire pressure signal 3a-3d is identified by the algorithm 10 with a specified identification (ID) that is validated at step 16. Because surrounding vehicles may be also transmitting their own tire pressure signal IDs for their own tire pressure monitoring systems, such unintentionally-received IDs identified at step 16 are simply ignored, and the algorithm 10 is looped back to step 14. However, if an intentional or unintentional interfering signal 5 is matched with a corrupting ID that passes the validation test at step 16, the interfering signal 5 associated with the corrupting ID is screened in a subsequent step identified at reference numeral 24.

Accordingly, if such a condition occurs, the algorithm 10 may process the interfering signal 5 with the expected tire pressure signals 3a-3d as follows starting with step 18. At step 18, the algorithm 10 tracks the number of signal readings for each tire pressure signal ID during a sampling period to determine if enough readings have been received so as to average the signal strength in step 26. As such, if the expected number of signal readings during the sampling period were not received, the algorithm logic at step 20 is looped back to step 14. However, if the expected number of signal readings were received at step 20, the algorithm is further advanced to step 22.

In step 22, the algorithm measures the signal strength for wireless tire pressure signals 3a-3d associated with their respective IDs. Then, at step 24, the second conditional test compares the measured signal strength for each tire pressure signal 3a-3d associated with the expected IDs against the dynamically-adjusted signal strength envelope. If the measured signal strength is within or close to the signal strength range defined by the upper and lower limits, the algorithm 10 is advanced to step 26. Alternatively, if the measured signal strength is not close to or within the signal strength range, the interfering signal 5 associated with the expected ID may be detected and locked out by being advanced to step 30 from step 24. Because the signal strength envelope is dynamically adjusted over the life of the vehicle, V, it is increasingly difficult for an interfering signal 5 to tamper with the operation of the system 1a.

The dynamic adjustment of the signal strength envelope is performed at steps 26 and 28, which is subsequent to the conditional test at step 24 if no lock-out period has occurred for the screened tire pressure signals. At step 26, the measured signal strengths from step 22 are averaged to calculate an averaged signal strength value. Then, at step 28, the envelope limits are dynamically updated in view of the averaged signal strength value calculated in step 26.

According to one embodiment of the invention, step 28 may include a first calculation to determine the percentage difference of the averaged value against the upper and lower limit values. Then, the calculated percent difference is added or subtracted to the upper and lower limits. It will be appreciated that the above-described update at step 28 may be carried out by using other designs. For example, after the average value is determined, the averaged value may be compared against the upper and lower limits, and then the average value may be swapped with one of the upper and lower limits.

Accordingly, the illustrated algorithm logic 10 may screen and lockout an interfering signal 5 according to the conditional test at step 24. As such, if an interfering signal 5 is imparted onto the system 1a, the algorithm logic 10 maintains proper operation of the system 1a. As shown in FIG. 3B, the lockout may occur for any desirable period of time and may be incremented accordingly at step 32. When the algorithm 10 has determined that the lockout period has ended at step 34, the failed tire pressure signal ID(s) is unlocked at step 36 and the algorithm logic 10 returns to the beginning of the loop at step 14. Thus, even if the interfering signal 5 maintains its presence after being unlocked at step 36, the interfering signal 5 associated with an expected ID may be continuously locked out until it wanes.

Although only one conditional test is shown at step 24, any desirable numbers of tests may be implemented in the algorithm 10 in any desirable scheme. Additionally, such additional conditional tests may be dynamic in nature as in step 24, and may be adjusted in a similar fashion as shown in steps 26-28 when the upper and lower limits of the average signal strength changes during normal operation of the algorithm 10. As such, because the conditional tests may be dynamic, the algorithm 10 lends itself to a constantly changing defense mechanism that would make it increasingly difficult for an intentional or unintentional interfering signal attack to be successfully executed.

Figure 1:
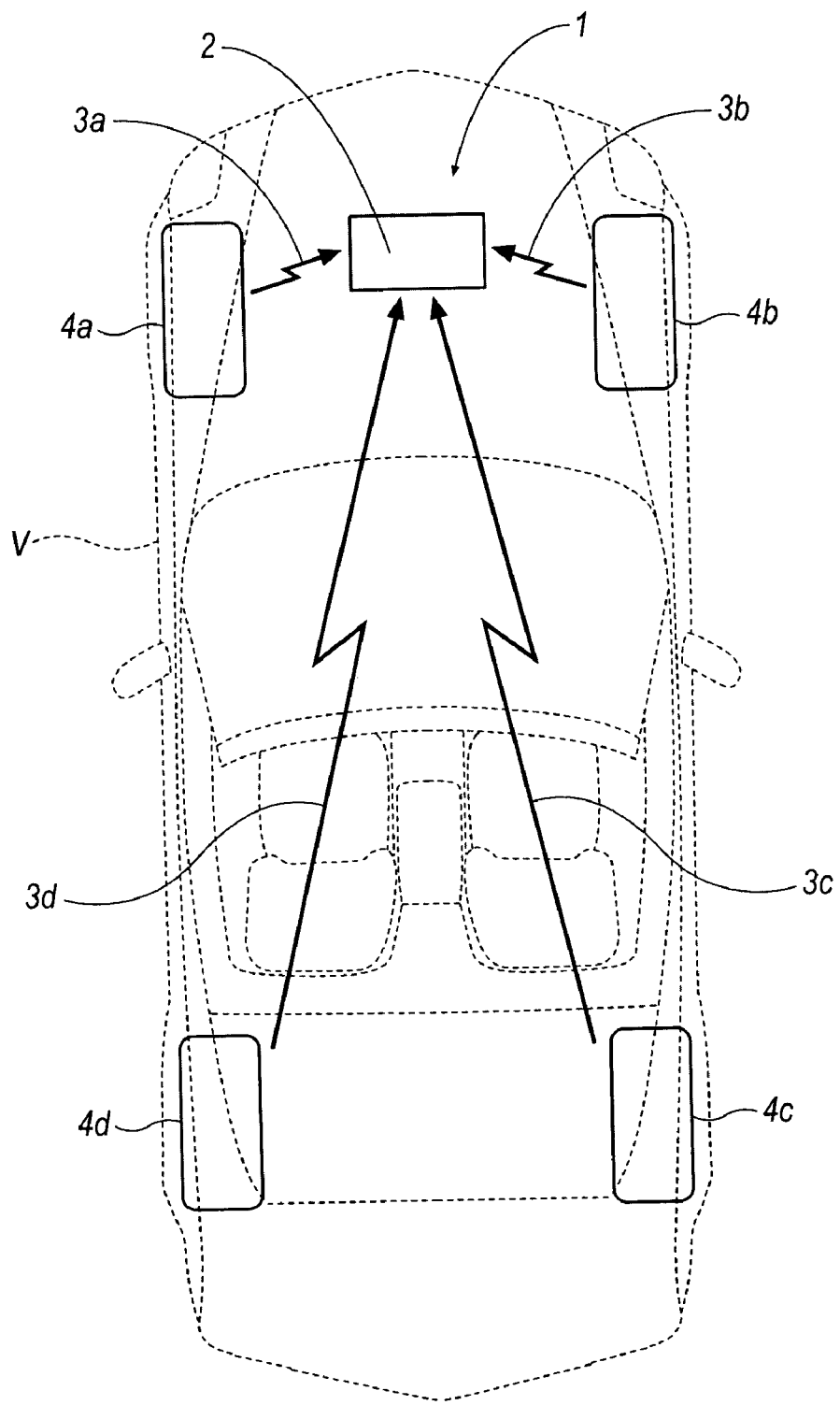
FIG. 1 illustrates a plan view of a conventional tire pressure monitoring system applied to a vehicle.
Figure 2:
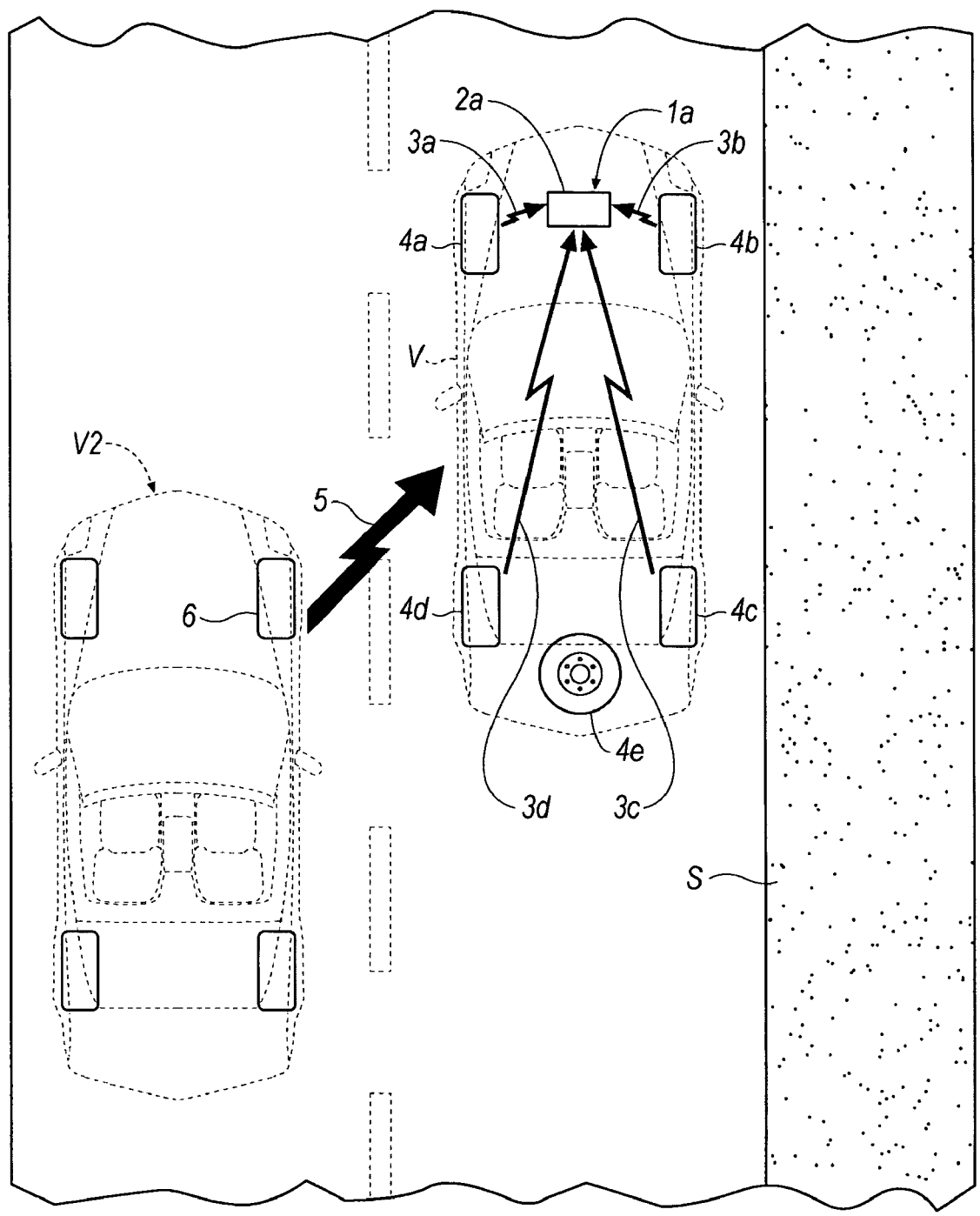
FIG. 2 illustrates an environmental view of the tire pressure monitoring system according to one embodiment of the invention.
Figure 4:
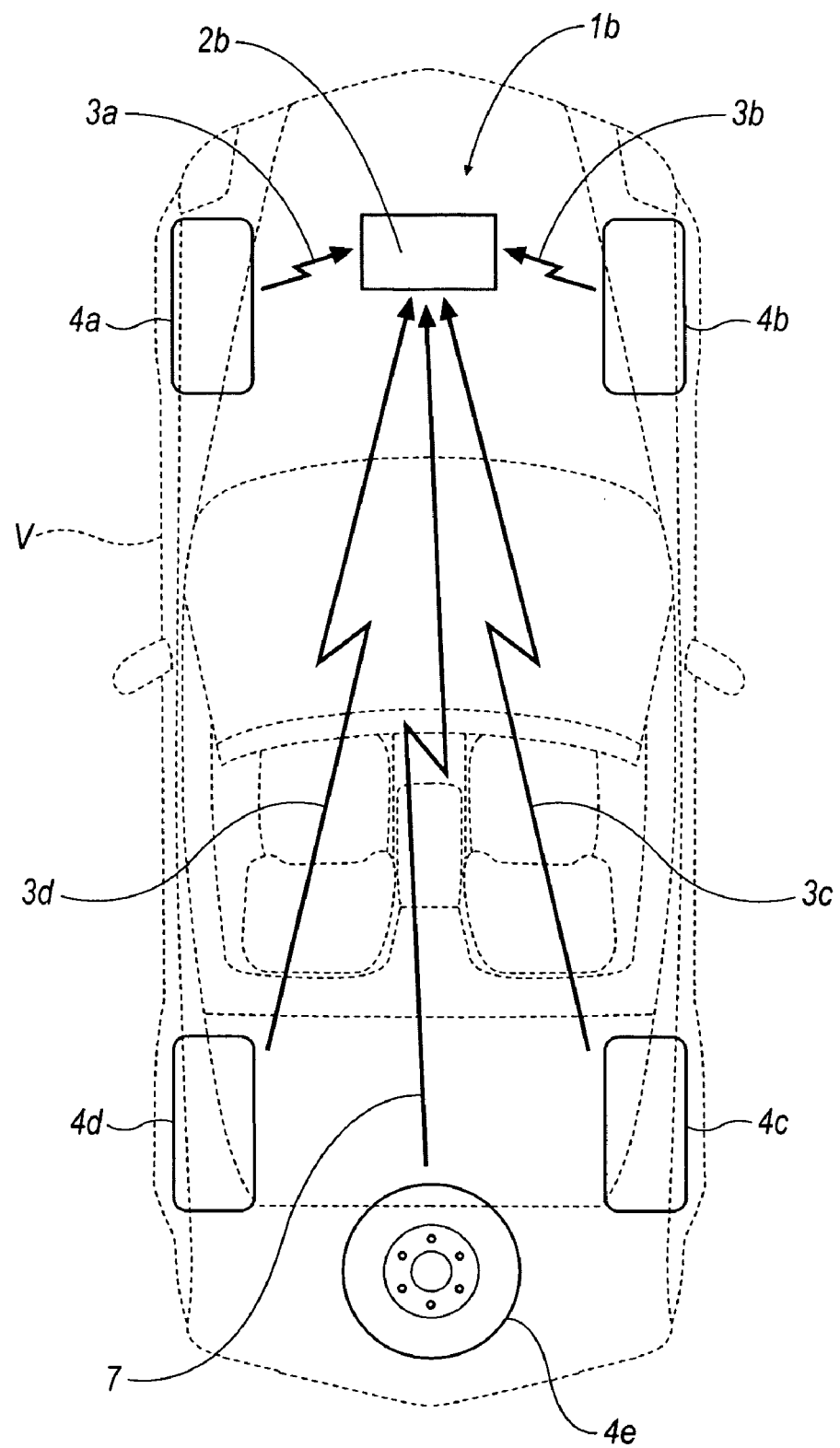
FIG. 4 illustrates a plan view of a tire pressure monitoring system applied to a vehicle according to another embodiment of the invention.

Referring to FIG. 4, another embodiment of the invention is directed to a situation that addresses the potential for reception of an interfering signal originating from within the vehicle, V. As illustrated, a spare tire 4e transmits a signal 7 including a tire pressure signal ID such that the receiver 2b looks for five wireless tire pressure signals 3a-3d, and 7 associated with five tire pressure signal IDs rather than four wireless tire pressure signals 3a-3d associated with four tire pressure signal IDs as in the embodiment described in FIGS. 2-3B. Accordingly, the system 1b permits itself to monitor if one of the in-use tires 4a-4d becomes flat and is swapped with the spare tire 4e. If the swap is not properly recognized by the receiver 2b, the previously-designated in-use tire, which may be reconfigured to a stationary state, may result in the unintentional sending of a false signal to the receiver 2b from within the vehicle, V.

As seen in FIG. 5, algorithm logic 100 according to another embodiment of the invention is provided for the system 1b such that the receiver 2b automatically updates in-use and spare tire location. As similarly described above with respect to FIGS. 3A and 3B, the system 1*b* is started at step A. Then, at step 102, wireless tire pressure signals 3*a*-3*d* and 7 relating to tire pressure signal IDs of the in-use tires 4*a*-4*d* and spare tire 4*e* are sent to the receiver 2*b*. At step 104, the algorithm logic 100 checks to see if the wireless tire pressure signal 7 relating to the spare tire 4*e* is in a stationary state. The stationary state of any of the tires 4*a*-4*e* may be based upon any desirable transmission rate or coded message content. If it is determined that the spare tire 4*e* is in a stationary state, the algorithm logic 100 is advanced to steps 106 and 108 where flags relating to an unloaded and loaded state identifier tags are maintained for the spare and in-use tires 4*a*-4*e*. After steps 106 and 108 are executed, the algorithm logic 100 is returned to the beginning of the loop at step A.

If the receiver 2*b* discovers that the spare tire 4*e* has been swapped with an in-use tire 4*a*-4*d*, step 104 is advanced to step 110. For the algorithm logic 100 to permit advancement to step 110, it must be determined at step 104 that the spare tire 4*e* is no longer in a stationary state (i.e., the spare tire 4*e* is in a rotational state). If so, the spare tire 4*e* is flagged with a loaded state identifier at step 110. Then, at step 112, the algorithm logic 100 determines which tire 4*a*-4*d* is no longer under an in-use condition (i.e., the determined tire 4*a*-4*d* is in a stationary state). At step 114, upon determining which tire 4*a*-4*d* is in the stationary state at step 112, the determined tire 4*a*-4*d* is flagged with an unloaded state identifier tag. Then, at step 116, the algorithm logic 100 swaps the spare tire pressure signal ID with the in-use tire pressure signal ID. After the IDs are properly swapped, the algorithm logic 100 is returned to the beginning of the loop at step A.

Accordingly, both embodiments of the invention illustrated in FIGS. 2-5 provide a modification to conventional tire pressure monitoring systems such that the wireless in-use tire signals 3*a*-3*d* are secured by the algorithm logic 10, 100 without costly changes, such as signal encryption. Thus, an inexpensive method is provided and the tire pressure signal 3*a*-3*d* data may be easily maintained by the receiver 2*a*, 2*b*.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A method for monitoring tire pressure of a system, comprising the steps of:
    detecting an interfering signal that is a signal other than that of in-use tire pressure signals;
    maintaining the proper reception of the in-use tire pressure signals by a single receiver when the interfering signal is detected;
    initializing the system with a learned signal strength envelope for differentiating the interfering signal and the in-use tire pressure signals;
    measuring a signal strength of the in-use tire pressure signals; and
    differentiating between the interfering signal and the in-use tire pressure signals based upon a measured signal strength indicator of the in-use tire pressure signals.

2. The method according to claim 1, further comprising the step of associating each in-use tire pressure signal with a tire pressure signal identifier to differentiate the interfering signal from the in-use tire pressure signals.

3. The method according to claim 1, wherein the step of initializing the system with a learned signal strength envelope comprises:
    setting an upper average signal strength limit; and
    setting a lower average signal strength limit.

4. The method according to claim 3, wherein, if the signal strength for each in-use tire pressure signal is close to or within the signal strength envelope, the method further comprises the step of averaging the signal strength for all of the in-use tire pressure signals.

5. The method according to claim 4, further comprising the step of dynamically updating the upper and lower average signal strength limits of the signal strength envelope in view of the averaged signal strength of the in-use tire pressure signals.

6. The method according to claim 5, wherein, if the averaged signal strength is lower than the lower average signal strength limit, the method further comprises the steps of
    calculating a percentage difference between an averaged signal strength value and the upper average signal strength limit and the lower average signal strength limit, wherein a percentage calculated from the averaged signal strength value and the lower average signal strength limit is subtracted from a percentage calculated from the averaged signal strength value and the upper average signal strength limit; and
    adding or subtracting the percentage difference to or from the upper average signal strength limit and the lower average signal strength limit.

7. The method according to claim 1, wherein the maintaining step further comprises the steps of locking-out the interfering signal.

8. The method according to claim 7, wherein the locking-out step further comprises the step of monitoring a lockout period and incrementing a lockout counter until the locking-out step is terminated.

9. The method according to claim 1, wherein, prior to the detecting step, further comprising the step of propagating the interfering signal from a nearby vehicle to a vehicle included in the system.

10. A method for monitoring tire pressure of a system, comprising the steps of:
    propagating an interfering signal from a nearby vehicle to a vehicle including a tire pressure monitoring system;
    detecting that the interfering signal is not originating from an in-use tire associated with in-use tire pressure signals for the tire pressure monitoring system;
    maintaining the proper reception of the in-use tire pressure signals by a single receiver when the interfering signal is detected;
    propagating a signal from a spare tire;
    detecting when the in-use tire is replaced with the spare tire; and
    automatically updating a location of one of the in-use tire and the spare tire.

11. The method according to claim 10, further comprising the step of determining if the spare tire is in a stationary state.

12. The method according to claim 11, further comprising the steps of:
    flagging the spare tire with an unloaded state identifier; and
    flagging the in-use tires with loaded state identifiers.

13. The method according to claim 10, further comprising the step of determining if the spare tire is in a rotational state.

14. The method according to claim 13, further comprising the step of flagging the spare tire with a loaded state identifier.

15. The method according to claim 14, further comprising the step of determining which in-use tire is no longer under an in-use condition, and upon determining which tire is no longer under an in-use condition, the determined tire is flagged with an unloaded state identifier.

16. The method according to claim 15, further comprising the step of swapping IDs of the in-use tire, which was previously the spare tire, and the determined tire.

17. A method for monitoring tire pressure of a system, comprising the steps of:
propagating an interfering signal from a spare tire stowed about a vehicle including a tire pressure monitoring system;
detecting that the interfering signal is not originating from an in-use tire associated with in-use tire pressure signals for the tire pressure monitoring system;
maintaining the proper reception of the in-use tire pressure signals by a single receiver when the interfering signal is detected;
detecting when the in-use tire is replaced with the spare tire; and
automatically updating a location of one of the in-use tire and the spare tire.

18. The method according to claim 17, further comprising the step of determining if the spare tire is in a stationary state.

19. The method according to claim 18, further comprising the steps of:
flagging the spare tire with an unloaded state identifier; and
flagging the in-use tires with loaded state identifiers.

20. The method according to claim 17, further comprising the step of determining if the spare tire is in a rotational state.

21. The method according to claim 20, further comprising the step of flagging the spare tire with a loaded state identifier.

22. The method according to claim 21, further comprising the step of determining which in-use tire is no longer under an in-use condition, and upon determining which tire is no longer under an in-use condition, the determined tire is flagged with an unloaded state identifier.

23. The method according to claim 22, further comprising the step of swapping IDs of the in-use tire, which was previously the spare tire, and the determined tire.

* * * * *